(12) United States Patent
Borngräber et al.

(10) Patent No.: US 10,386,853 B2
(45) Date of Patent: Aug. 20, 2019

(54) METHOD FOR ACCESSING A VEHICLE-SPECIFIC ELECTRONIC DEVICE

(71) Applicant: VOLKSWAGEN AG, Wolfsburg (DE)

(72) Inventors: Ralf Borngräber, Lehre (DE); Ulrich Kleine, Gifhorn (DE); Christoph Hoffmann, Wolfsburg (DE)

(73) Assignee: Volkswagen AG (DE)

( * ) Notice: Subject to any disclaimer, the term of this patent is extended or adjusted under 35 U.S.C. 154(b) by 72 days.

(21) Appl. No.: 15/723,706

(22) Filed: Oct. 3, 2017

(65) Prior Publication Data
US 2018/0095477 A1 Apr. 5, 2018

(30) Foreign Application Priority Data
Oct. 4, 2016 (DE) .................. 10 2016 219 134

(51) Int. Cl.
| | | |
|---|---|---|
| *G05D 1/02* | (2006.01) | |
| *H04M 1/00* | (2006.01) | |
| *H04M 1/60* | (2006.01) | |
| *B60W 50/00* | (2006.01) | |
| *G06F 21/00* | (2013.01) | |

(52) U.S. Cl.
CPC ........... *G05D 1/0285* (2013.01); *B60W 50/00* (2013.01); *G06F 21/00* (2013.01); *H04M 1/6075* (2013.01)

(58) Field of Classification Search
CPC ...... G05D 1/0285; B60W 50/00; G06F 21/00; H04M 1/6075
USPC .......................................................... 701/23
See application file for complete search history.

(56) References Cited

U.S. PATENT DOCUMENTS

| | | | |
|---|---|---|---|
| 8,229,888 B1* | 7/2012 | Roskind ........... | H04N 21/25808 707/611 |
| 8,718,797 B1* | 5/2014 | Addepalli ............. | H04W 4/046 700/17 |
| 2002/0046084 A1 | 4/2002 | Steele et al. | |
| 2009/0316673 A1* | 12/2009 | Yagley .................. | H04W 12/06 370/338 |
| 2011/0205965 A1* | 8/2011 | Sprigg .................. | G06F 9/4411 370/328 |
| 2012/0200407 A1 | 8/2012 | Morris | |
| 2012/0242687 A1 | 9/2012 | Choi | |
| 2015/0262239 A1 | 9/2015 | Goralnick | |

(Continued)

FOREIGN PATENT DOCUMENTS

| | | |
|---|---|---|
| DE | 19743024 A1 | 4/1999 |
| DE | 102012010887 A1 | 12/2013 |
| DE | 102012213965 A1 | 2/2014 |

(Continued)

*Primary Examiner* — Marthe Y Marc-Coleman
(74) *Attorney, Agent, or Firm* — Barnes & Thornburg LLP

(57) ABSTRACT

A method for accessing an electronic device of a vehicle driver outside the vehicle including providing a vehicle which assists the vehicle driver by at least one driver assistance system while driving the vehicle and providing an electronic device of the vehicle driver outside the vehicle which communicates with the vehicle. The method includes the reproduction inside the vehicle of data contents which are stored on the electronic device of the vehicle driver outside the vehicle while the at least one driver assistance system is active. The disclosure enables a vehicle driver to perform personal tasks via one of his/her personal electronic devices during the assisted driving of a vehicle.

14 Claims, 2 Drawing Sheets

(56) References Cited

U.S. PATENT DOCUMENTS

2015/0372832 A1  12/2015  Kortz et al.

FOREIGN PATENT DOCUMENTS

| | | |
|---|---|---|
| DE | 102013002533 A1 | 8/2014 |
| DE | 102013003040 A1 | 8/2014 |
| DE | 102013206212 A1 | 10/2014 |
| DE | 112013002743 T5 | 3/2015 |
| DE | 102014106241 A1 | 5/2015 |
| DE | 102014214078 A1 | 1/2016 |
| DE | 112014003806 T5 | 5/2016 |

* cited by examiner

METHOD FOR ACCESSING A VEHICLE-SPECIFIC ELECTRONIC DEVICE

PRIORITY CLAIM

This patent application claims priority to German Patent Application No. 10 2016 219 134.9, filed 4 Oct. 2016, the disclosure of which is incorporated herein by reference in its entirety.

SUMMARY

Illustrative embodiments relate to a method for accessing an electronic device outside a vehicle and a communication system.

BRIEF DESCRIPTION OF THE DRAWINGS

The disclosed embodiments are explained below with reference to the associated drawings. In the drawings.

DETAILED DESCRIPTION

Figure 1:
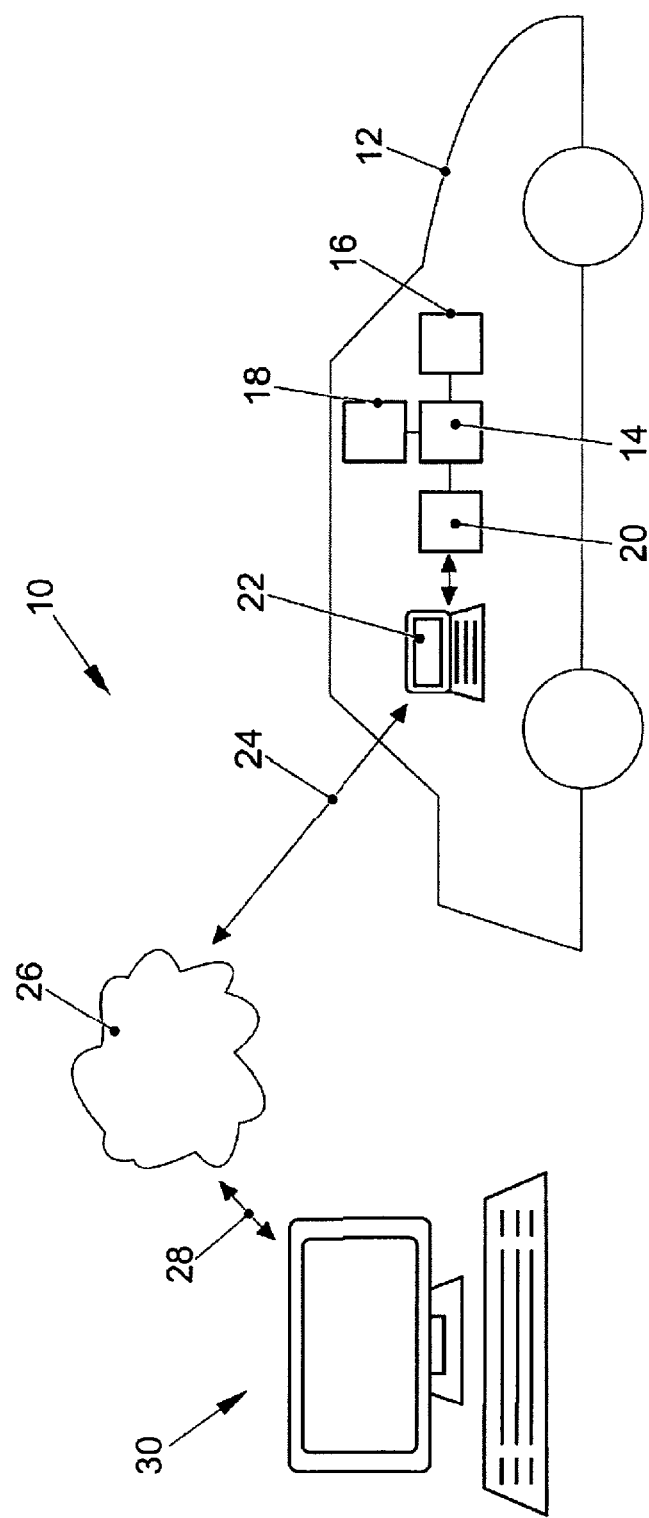
FIG. 1 shows an example embodiment of a disclosed communication system.

The increasing intelligence of modern vehicles results in a continuing easing of the burden on the vehicle driver when driving a vehicle. In future, driver assistance systems will take over a growing number of vehicle driving tasks from the vehicle driver so that the vehicle driver can pursue further activities during the journey time.

It has already been recognized that the vehicle driver's attention must be checked from time to time during an autonomous journey so that the vehicle driver can intervene manually in the driving of the vehicle if the need arises.

For this purpose, document DE 10 2012 213 965 A1 proposes a method for ensuring an adequate capability of a driver, wherein the driver is prompted continually at time intervals to perform a task in the vehicle during the automated driving of a vehicle. The performance of the task is evaluated and the degree of automation for the automated driving is reduced or maintained depending on the evaluation.

A method for controlling a vehicle is known from document DE 10 2013 206 212 A1, wherein the vehicle can be operated in an operating mode with autonomous vehicle driving and in a driver-controlled operating mode. In the operating mode with autonomous vehicle driving, the driver's attention is monitored to ensure a takeover, which may possibly become necessary, of the control responsibility by the driver within a predefined takeover time window. If the driver is already otherwise active during autonomous driving phases, for example, is operating a communication system to edit messages or to surf the Internet, and this is detected by the vehicle control, a sufficient level of attention of the driver can be assumed, so that tasks do not have to be set to check attention.

It is known that the vehicle driver can access data contents outside the vehicle. For this purpose, document DE 19743024A1 discloses a motor vehicle in which an operating device is provided by which communication mechanisms are activatable for the purpose of performing a communication procedure and vehicle driving mechanisms are activatable for the purpose of autonomous driving of the vehicle. This ensures that autonomous vehicle driving can be activated if the vehicle driver requests the performance of a communication procedure with an electronic communication system or access to electronic communication systems is granted or enabled for the driver if an autonomous vehicle function is activated. The communication mechanisms may contain connections to electronic databases, e.g., Internet access. This enables the vehicle driver to access electronic information on the Internet or as electronic newspapers or electronic mail. The vehicle driver furthermore has an entertainment facility, for example, through the retrieval of video games.

These solutions take into account that a vehicle driver can take over further activities when driving an autonomous or partially autonomous vehicle, but provide the vehicle driver with general information only, which does not relate to his/her personal area of activity.

Independently from autonomous vehicle driving, DE 10 2012 010 887 A1 proposes a motor vehicle with a control unit which is designed to switch an operating state of a computer system for office applications outside a vehicle between an active state in which the computer system runs at least one office application software program and a passive state in which the computer system is deactivated.

Document DE 11 2013 002 743 T5 discloses the use of virtual network computing to allow a device of the vehicle to transmit control signals to a mobile device, and to allow the display or parts of the display of the mobile device to be reproduced on the display screen of the vehicle device.

In addition, a system for remote desktop sharing of a vehicle display device is known from DE 11 2014 003 806 T5. Along with the vehicle display device, the system comprises a further display device. A graphics-sharing module can make the representation of the graphical user interface of the vehicle display device available to the further display device.

These solutions focus on the networking of the vehicle with other electronic devices, but do not take account of the circumstance that time is available to a driver for the performance of personal tasks while driving an autonomously or partially autonomously controlled vehicle.

The disclosed embodiments enable a vehicle driver to perform personal tasks via one of his/her personal electronic devices during the assisted driving of a vehicle.

Disclosed embodiments provide a method and a communication system.

The disclosed method for accessing an electronic device of a vehicle driver outside the vehicle comprises the provision of a vehicle which is configured to support the vehicle driver by at least one driver assistance system while driving the vehicle and the provision of an electronic device of the vehicle driver outside the vehicle which is configured to communicate with the vehicle. According to the disclosure, data contents which are stored on the electronic device of the vehicle driver outside the vehicle are reproduced inside the vehicle while the at least one driver assistance system is active. The electronic device of the vehicle driver outside the vehicle is an electronic device which the vehicle driver uses for private and/or professional purposes, such as, for example, a personal computer at his/her place of residence or workplace. The electronic device of the vehicle driver outside the vehicle may also be a privately and/or professionally used laptop, tablet or other mobile terminal device, such as, for example, a Smartphone. The communication between the vehicle and the electronic device of the vehicle driver outside the vehicle may take place directly by a direct communication connection between the vehicle and the electronic device of the vehicle driver outside the vehicle and/or indirectly via one or more other communication devices. The communication between the vehicle and the electronic device outside the vehicle may take place using an Internet connection. The reproduction inside the vehicle of data contents which are stored on the electronic device of the vehicle driver outside the vehicle may be implemented visually and audibly.

The disclosed method offers the vehicle driver the ability to access one or more of his/her electronic devices while driving the vehicle and can therefore use the journey time to perform personal tasks. The vehicle is controlled by the at least one driver assistance system during the performance of the personal tasks. Since data contents from one of his/her personal electronic devices can be reproduced for the vehicle driver inside the vehicle, during the journey the vehicle driver can instigate the display, for example, of texts, spreadsheets, images and/or video sequences and/or the playback of audio files which are stored on the remotely located personal electronic device.

The data contents which are stored on the electronic device of the vehicle driver outside the vehicle can be reproduced inside the vehicle by a reproduction device of the vehicle. The reproduction device of the vehicle may, for example, comprise a display of the vehicle or a touchscreen of the vehicle. The display may be designed, for example, as a component of a freely programmable instrument cluster of the vehicle. The reproduction device of the vehicle may also comprise a head-up display of the vehicle. The reproduction device of the vehicle may furthermore have a sound reproduction device of the vehicle which has one or more loudspeakers. Alternatively or additionally, the data contents which are stored on the electronic device of the vehicle driver outside the vehicle may be reproduced inside the vehicle by a mobile reproduction device which has a signal-transmitting connection to the vehicle. The signal transmission between the vehicle and the mobile reproduction device may be designed as wireless and/or wired. The BLUETOOTH® standard or a wireless local network may be used for the signal transmission between the vehicle and the mobile reproduction device. The mobile reproduction device comprises, for example, a display or touchscreen and/or a sound reproduction device.

The reproduction device of the vehicle and/or the mobile reproduction device which has a signal-transmitting connection to the vehicle can be supplied with a reproduction signal generated by the electronic device of the vehicle driver outside the vehicle. The computing processes for generating the reproduction signal on the electronic device of the vehicle driver outside the vehicle are implemented by way of a remote desktop system. No computing power of the reproduction device of the vehicle and/or of the mobile reproduction device which has a signal-transmitting connection to the vehicle is therefore used to generate the reproduction signal. The reproduction device of the vehicle and/or the mobile reproduction device which has a signal-transmitting connection to the vehicle merely provide the reproduction function, in particular, the display function and/or the sound reproduction function.

The method may comprise the provision inside the vehicle of an editing facility for data contents which are stored on the electronic device of the vehicle driver outside the vehicle while the at least one driver assistance system is active. Data contents can thereby be modified on the personal electronic device of the vehicle driver during the journey. For example, the vehicle driver can therefore use the time to produce and/or modify texts, spreadsheets, images, videos and/or sound files on the electronic device outside the vehicle.

The editable data contents which are stored on the electronic device of the vehicle driver outside the vehicle can be edited inside the vehicle by an operating device of the vehicle. The operating device of the vehicle may, for example, have pressure-sensitive input devices, such as push-buttons or a touchscreen. The operating device of the vehicle may furthermore be configured to convert voice commands into corresponding control signals. The operating device of the vehicle may furthermore have a gesture recognition so that an operation can be performed via gestures of the vehicle driver. Alternatively or additionally, the editable data contents which are stored on the electronic device of the vehicle driver outside the vehicle may be edited by a mobile operating device inside the vehicle which has a signal-conducting connection to the vehicle. The communication between the vehicle and the mobile operating device may be designed as wireless and/or wired. The BLUETOOTH® standard or a wireless local network may be used for the signal transmission between the vehicle and the mobile operating device. The mobile operating device comprises, for example, pressure-sensitive input devices, such as push-buttons or a touchscreen. The mobile operating device may furthermore be configured to convert voice commands into corresponding control signals. The mobile operating device may furthermore have a gesture recognition so that an operation can be performed via gestures of the vehicle driver. The mobile operating device may, for example, be a mouse, trackpad and/or keypad.

The data contents which are stored on the electronic device of the vehicle driver outside the vehicle can be reproduced inside the vehicle by virtual network computing. Alternatively or additionally, the editable data contents which are stored on the electronic device of the vehicle driver outside the vehicle can be edited inside the vehicle by virtual network computing. By virtual network computing, the screen content of the electronic device of the vehicle driver outside the vehicle can be presented on a display inside the vehicle. Operating inputs which are performed inside the vehicle can be transmitted simultaneously to the electronic device of the vehicle driver outside the vehicle. A Virtual Private Network Tunnel may be used for the data transmission between the vehicle and the electronic device of the vehicle driver outside the vehicle.

The method may furthermore comprise the detection of the operating state of the at least one driver assistance system. The at least one driver assistance system may, for example, be switchable between an activated state and a deactivated state. For driving safety reasons, it may be beneficial to disable the reproduction and/or editing inside the vehicle of data contents which are stored on the electronic device of the vehicle driver outside the vehicle if the at least one driver assistance system is deactivated. If the at least one driver assistance system is deactivated, the vehicle must be driven manually by the vehicle driver so that the vehicle driver must devote increased attention to driving the vehicle. These functions can be disabled to avoid the risk of a distraction by the reproduction and/or editing of data contents which are stored on the electronic device of the vehicle driver outside the vehicle.

The at least one driver assistance system may enable assisted, highly automated and/or autonomous driving. Assisted driving, for example, using an adaptive cruise control system and/or an active lane departure warning system, already allows the performance of simple private and professional tasks during the journey. Highly automated driving further reduces the necessary control interventions by the vehicle driver so that, with highly automated driving, more extensive tasks can already be performed during the journey. These tasks comprise, for example, reading or studying texts or graphics, listening to audio files or creating or editing simple text files. During autonomous driving, the vehicle driver can even devote himself/herself to the performance of complex tasks which require a high degree of attention and/or concentration on the part of the vehicle driver.

The vehicle and the electronic device of the vehicle driver outside the vehicle may communicate with one another via one or more intermediate devices. The vehicle has, for example, a local wireless network, and an intermediate device, such as a Smartphone or laptop, provides the vehicle with an Internet connection via the local wireless network, wherein the electronic device of the vehicle driver outside the vehicle is similarly connected to the Internet. In this way, the vehicle can set up a signal-transmitting connection via the Internet to the electronic device of the vehicle driver outside the vehicle without the vehicle itself having to have the corresponding hardware and/or software to provide an Internet connection. The number of vehicles which can carry out the described method is thus considerably increased.

The disclosed communication system comprises a vehicle which has at least one driver assistance system, and an electronic device of a vehicle driver outside the vehicle which is configured to communicate with the vehicle. The communication system is configured to carry out the method for accessing an electronic device of a vehicle driver outside the vehicle according to at least one of the embodiments described above. The same benefits and modifications as previously described apply.

The different embodiments specified in this application are combinable with one another, unless otherwise stated in individual cases.

FIG. 1 shows a communication system 10 with a vehicle 12 and an electronic device 30 of a vehicle driver outside the vehicle.

The vehicle 12 has a control unit 14, a driver assistance system 16, a reproduction and operating device 18 of the vehicle and a communication module 20. The control unit 14 has a signal-transmitting connection to the driver assistance system 16, the reproduction and operating device 18 of the vehicle and the communication module 20 and is configured to control the driver assistance system 16, the reproduction and operating device 18 of the vehicle and the communication module 20.

The driver assistance system 16 enables the highly automated driving of the vehicle 12 and extremely rarely requires manual control interventions of the vehicle driver. The reproduction and operating device 18 of the vehicle forms part of the infotainment system of the vehicle 12 and comprises a visual reproduction device designed as a touch-screen and a plurality of loudspeakers for the audible reproduction of data contents. The reproduction and operating device 18 furthermore comprises a pressure-sensitive input device which comprises a plurality of push-buttons. The communication module 20 provides a local wireless network of the vehicle via which electronic devices can communicate with the vehicle 12.

An intermediate device 22 designed as a laptop is connected to the wireless local network of the vehicle. The intermediate device 22 is furthermore connected via the wireless communication connection 24 to the Internet 26.

The electronic device 30 of the vehicle driver outside the vehicle is the vehicle driver's own personal computer which is located at the place of residence of the vehicle driver. The electronic device 30 of the vehicle driver outside the vehicle is connected via the communication connection 28 to the Internet 26. The vehicle 12 and the electronic device 30 of the vehicle driver outside the vehicle can thus communicate with one another via the intermediate device 22 and the Internet 26.

Since the vehicle 12 has access to the data contents which are stored on the electronic device 30 of the vehicle driver outside the vehicle, these data contents can be reproduced and edited inside the vehicle 12 while the driver assistance system 16 is active and the vehicle driver thus has time to perform personal tasks. The data contents which are stored on the electronic device 30 of the vehicle driver outside the vehicle are reproduced and edited inside the vehicle 12 by virtual network computing.

Figure 2:
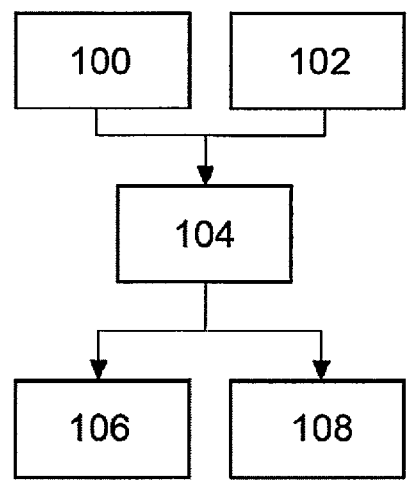
FIG. 2 shows an example embodiment of a disclosed method in a block diagram.

FIG. 2 shows a method for accessing an electronic device 30 of a vehicle driver outside the vehicle. The method is initiated by the following two operations:

100) providing a vehicle 12 which is configured to support the vehicle driver by a driver assistance system 16 while driving the vehicle 12; and 102) providing an electronic device 30 of the vehicle driver outside the vehicle which is configured to communicate with the vehicle 12.

The driver assistance system 16 enables the autonomous driving of the vehicle 12 and thus allows the vehicle driver to perform other tasks during the journey. The electronic device 30 of the vehicle driver outside the vehicle is the professionally used personal computer of the vehicle driver which is located at the workplace of the vehicle driver. The vehicle 12 and the electronic device 30 of the vehicle driver outside the vehicle communicate with one another via the Internet. After the vehicle 12 and the electronic device 30 of the vehicle driver outside the vehicle have been provided, the following operation can be carried out:

104) detecting the operating state of the driver assistance system 16.

The driver assistance system may be in an activated state or in a deactivated state. If the driver assistance system 16 is in the deactivated state, the vehicle driver is not supported by the driver assistance system 16 while driving the vehicle 12, so that the vehicle driver must devote attention to driving the vehicle. The performance of other tasks during the journey is to be avoided due to the associated increased accident risk. However, if the driver assistance system 16 is in the activated state, the following operation can be carried out:

106) reproducing, inside the vehicle 12, data contents which are stored on the electronic device 30 of the vehicle driver outside the vehicle while the driver assistance system 16 is active.

The data contents which are stored on the electronic device 30 of the vehicle driver outside the vehicle are reproduced inside the vehicle 12 by a reproduction device 18 of the vehicle, wherein the reproduction device 18 of the vehicle is provided with a reproduction signal generated by the electronic device 30 of the vehicle driver outside the vehicle. If the driver assistance system 16 is in the activated state, the following operation can furthermore be carried out:

108) providing an editing facility inside the vehicle 12 for data contents which are stored on the electronic device 30 of the vehicle driver outside the vehicle while the driver assistance system 16 is active.

The editable data contents which are stored on the electronic device 30 of the vehicle driver outside the vehicle are edited inside the vehicle 12 by an operating device 18 of the vehicle, wherein the data contents which are stored on the electronic device 30 of the vehicle driver outside the vehicle are reproduced and edited inside the vehicle 12 by virtual network computing.

Since data contents which are stored on an electronic device of a vehicle driver outside the vehicle can be reproduced and edited inside the vehicle, the disclosed embodiments allow the vehicle driver to perform personal tasks via one of his/her personal electronic devices while driving, if a driver assistance system of the vehicle is active.

REFERENCE NUMBER LIST

10 Communication system
12 Vehicle
14 Control unit
16 Driver assistance system
18 Reproduction and operating device of the vehicle
20 Communication module of the vehicle
22 Intermediate device
24 Communication connection
26 Internet
28 Communication connection
30 Electronic device outside the vehicle
100-108 Method operations

The invention claimed is:

1. A method for accessing a vehicle driver's electronic device outside the vehicle, wherein the vehicle supports the vehicle driver by a driver assistance system while driving the vehicle, the method comprising:
   determining a state of the at least one driver assistance system;
   receiving communication from the vehicle driver's electronic device at the vehicle;
   reproducing, inside the vehicle, data contents which are stored on the vehicle driver's electronic device located outside the vehicle; and
   providing an editing facility inside the vehicle for data contents which are stored on the electronic device of the vehicle driver outside the vehicle only while the at least one driver assistance system is active.

2. The method of claim 1, wherein the data contents which are stored on the vehicle driver's electronic device are reproduced inside the vehicle by a reproduction device of the vehicle and/or by a mobile reproduction device which has a signal-transmitting connection to the vehicle.

3. The method of claim 2, wherein the reproduction device of the vehicle and/or the mobile reproduction device which has a signal-transmitting connection to the vehicle is/are provided with a reproduction signal generated by the vehicle driver's electronic device outside the vehicle.

4. The method of claim 1, wherein the editable data contents which are stored on the vehicle driver's electronic device outside the vehicle are edited inside the vehicle by an operating device of the vehicle and/or by a mobile operating device which has a signal-transmitting connection to the vehicle.

5. The method of claim 1, wherein the data contents which are stored on the vehicle driver's electronic device outside the vehicle are reproduced inside the vehicle by virtual network computing and/or wherein the editable data contents which are stored on the vehicle driver's electronic device outside the vehicle are edited inside the vehicle by virtual network computing.

6. The method of claim 1, wherein the at least one driver assistance system enables assisted, highly automated and/or autonomous driving.

7. The method of claim 1, wherein the vehicle and the vehicle driver's electronic device outside the vehicle communicate with one another via one or more intermediate devices.

8. A communication system, comprising:
   a vehicle having at least one driver assistance system and communicating with an electronic device of a vehicle driver outside the vehicle,
   wherein the communication system carries out a method for accessing the vehicle driver's electronic device by determining a state of the at least one driver assistance system,
   receiving communication from the vehicle driver's electronic device at the vehicle, reproducing, inside the vehicle, data contents which are stored on the vehicle driver's electronic device located outside the vehicle; and
   providing an editing facility inside the vehicle for data contents which are stored on the electronic device of the vehicle driver outside the vehicle only while the at least one driver assistance system is active.

9. The communication system of claim 8, further comprising a reproduction device of the vehicle, wherein the data contents which are stored on the vehicle driver's electronic device are reproduced inside the vehicle by the reproduction device of the vehicle and/or by a mobile reproduction device which has a signal-transmitting connection to the vehicle.

10. The communication system of claim 9, wherein the reproduction device of the vehicle and/or the mobile reproduction device which has a signal-transmitting connection to the vehicle is/are provided with a reproduction signal generated by the vehicle driver's electronic device outside the vehicle.

11. The communication system of claim 8, further comprising an operating device of the vehicle, wherein the editable data contents which are stored on the vehicle driver's electronic device outside the vehicle are edited inside the vehicle by the operating device of the vehicle and/or by a mobile operating device which has a signal-transmitting connection to the vehicle.

12. The communication system of claim 8, wherein the data contents which are stored on the vehicle driver's electronic device outside the vehicle are reproduced inside the vehicle by virtual network computing and/or wherein the editable data contents which are stored on the vehicle driver's electronic device outside the vehicle are edited inside the vehicle by virtual network computing.

13. The communication system of claim 8, wherein the at least one driver assistance system enables assisted, highly automated and/or autonomous driving.

14. The communication system of claim 8, wherein the vehicle and the vehicle driver's electronic device outside the vehicle communicate with one another via one or more intermediate devices.

* * * * *